UNITED STATES PATENT OFFICE.

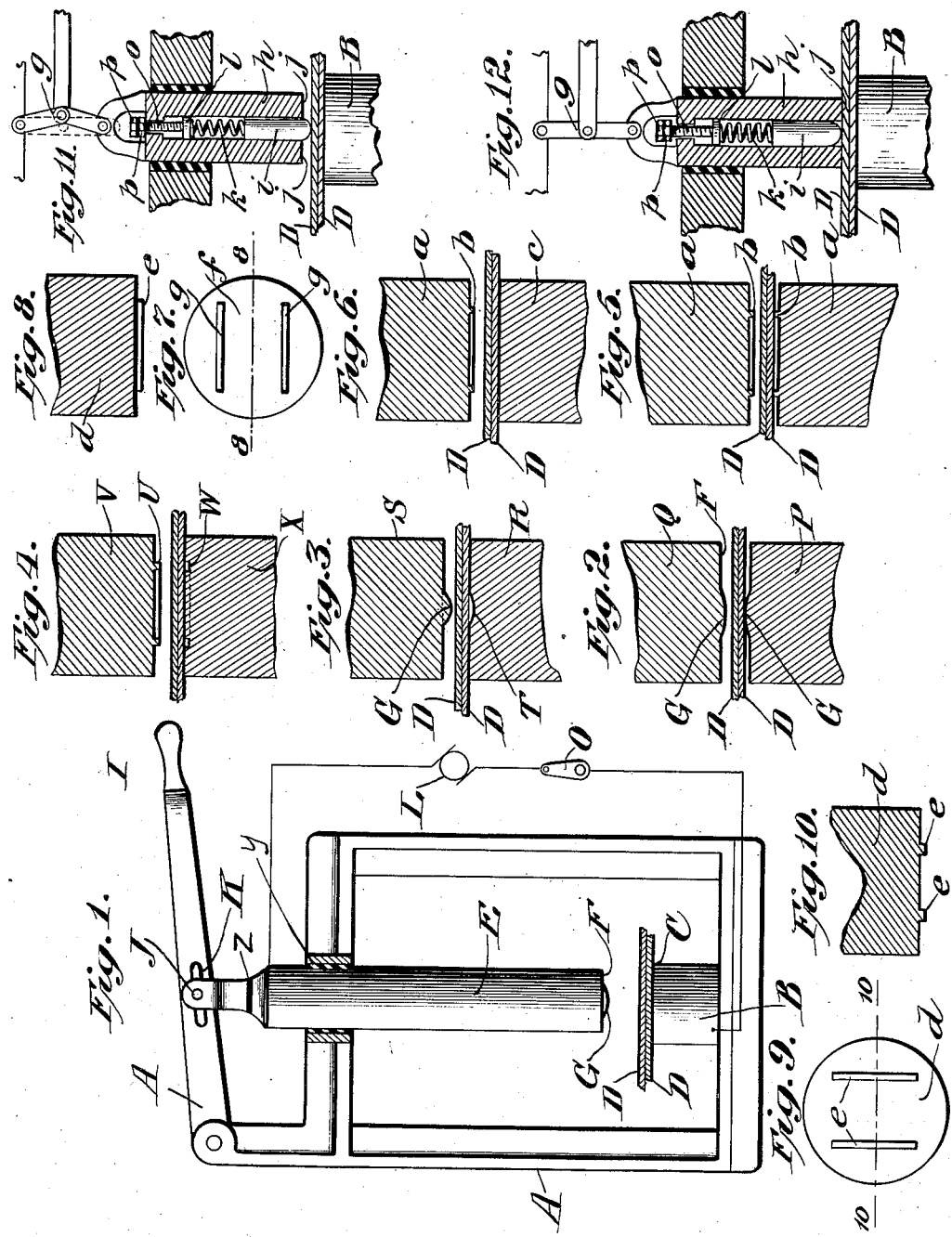

LAURENCE S. LACHMAN, OF NEW YORK, N. Y.

ELECTRIC WELDING-MACHINE.

No. 896,218.      Specification of Letters Patent.      Patented Aug. 18, 1908.

Application filed August 6, 1906, Serial No. 329,319. Renewed November 22, 1907. Serial No. 403,340.

*To all whom it may concern:*

Be it known that I, LAURENCE S. LACHMAN, a citizen of the United States, and resident of the borough of Manhattan, city, county, and State of New York, have invented certain new and useful Improvements in Electric Welding-Machines, of which the following is a specification, accompanied by drawings.
This invention relates to electric welding machines, more particularly to the electrodes therefor, and the objects of the invention are to enable sheet metal plates or metal of other forms to be welded together at a multiplicity of points by autogenous union.

Further objects of the invention will hereinafter appear and to these ends the invention consists of an electric welding machine for carrying out the above objects embodying the features of construction, combinations of elements, and arrangement of parts having the general mode of operation substantially as hereinafter fully described and as claimed in this specification and as shown in the accompanying drawings, in which,—

Figure 1 is a side elevation, partly in section of apparatus embodying the invention; Fig. 2 is an enlarged detail vertical sectional view showing an alternative construction of electrodes; Figs. 3, 4, 5 and 6 are enlarged detail sectional elevations showing further alternative forms of electrodes; Fig. 7 shows a face view and Fig. 8 a sectional elevation on the line 8—8 of Fig. 7 of a further alternative form of electrode; Fig. 9 is a face view and Fig. 10 a sectional elevation on line 10—10 of Fig. 9 of a further alternative form of electrode; Fig. 11 is a side elevation partly in section of another form of apparatus; and Fig. 12 is a side elevation partly in section of the apparatus shown in Fig. 11 in another position.

Referring to the drawings, A represents the frame of the machine of any suitable character, preferably of metal, provided with the lower electrode B, which has a broad flat face C, on which the material to be welded is placed. In this instance two sheets of metal D are shown in position for welding. The upper electrode E may be of any desired shape in cross-section, in this instance being shown cylindrical and as shown is provided with a flat face or surface F having a projecting portion or protuberance G extending beyond the plane of the surface F and of smaller area than said surface. As shown, in Fig. 1 the projection G in face view is circular and is provided with a curved surface, forming a contact button, although the shape of the projection G may be varied if desired.

The electrode E is preferably insulated from the frame A, as by a layer of insulating material, $y$ and provided with means for forcing it towards the electrode B, being separated and insulated from the pressure-applying means, as by interposed layer of insulating material $z$. Any suitable means may be provided for this purpose, as shown, there being an operating lever H pivoted to the frame and provided with a handle I. The electrode E is pivoted to the lever H by means of the pin J in the slot K. The electrodes B and E are connected in a circuit of a suitable source of current shown as a dynamo L, and a switch O is provided for connecting and disconnecting the dynamo.

The flat sheets D are placed upon the electrode B, the switch O closed, and the electrode E is forced into contact with the plates. The contact projection or button G first bears upon the upper plate D, at which point there will be high resistance, and the current passing through the electrodes and the plates will serve to highly heat the metal of the plates over a small area. At first the resistance is relatively high owing to the fact that at first only relatively a small portion of protuberance G is in contact with upper plate D, due to customary surface irregularities of the plate and electrode, and when said protuberance is rounded as shown in Fig. 1, owing to the rounded contour of such protuberance; and owing also to the inevitable incomplete contact of the two plates D and corresponding partial contact between lower plate D and electrode C. The heating of the plates D is therefore very rapid in the extremely localized region between the electrodes. As the plates become softened the pressure applied upon handle I forces the protuberance G into the upper plate, thereby improving the contact between the protuberance G and the upper plate D and also improving the contact between the two plates D and between the lower plate D and the low electrode C, all in the localized region corresponding to the contact area of protuberance G. The pressure thus produced and the heating in the extremely localized region mentioned, coöperate to produce a perfect welding of the two plates D in this localized region. At about the time when this welding is complete the metal will have become so softened that the protuberance G will have sunk into the metal to its full depth, bringing the larger plane surface F of electrode E into contact with upper plate D, the effect of which is to greatly widen the area through which the electric current passes, and, therefore, to greatly decrease the effective heating action of the current so that once the weld is completed the current is diffused through a larger portion of the plates D and over-heating or detrimental heating of the plates precluded. The plane surface F of electrode E further serves as a pressing surface which, in conjunction with the end of electrode D, serves to confine and even compress the softened and possibly fused or semi-fused metal at and in the immediate vicinity of the point of welding, thus preventing deterioration of the quality of the metal at this point, preventing the formation of a bur, and insuring a smooth union. Furthermore, the pressure of the electrodes or dies exerted in this manner prevents buckling, bending or distortion of the plates.

Metal plates about to be welded, unless carefully dried, usually have more or less of a layer of adhering moisture. This moisture is imprisoned between the plates when they are placed together and, being vaporized suddenly by the intense heat produced by the welding current, the steam tends to force the plates apart somewhat. This tendency dies E and D repress by the pressure they exert, insuring that the plates shall be welded together closely with their surfaces adjacent to the weld in contact. In hand operating apparatus such as described the upper electrode will then be withdrawn to break the circuit, but any suitable form of automatic circuit breaking apparatus may be provided, which will come into operation upon the increase of the current due to the decrease of resistance when the face F of the electrode bears upon the plate D. After the operations are completed, the plates will be joined by a spot weld at the point at which the operations have been conducted, and this operation may be continued at as many different points as desired. The plate which has been in contact with the button G will be slightly depressed at the point of weld.

In Fig. 2, each electrode P and Q is provided with a button or projection G projecting beyond the flat surface F, and the plates D are laid between the electrodes. In this instance the buttons G first contact with the plates, and after the operation is completed there will be a slight depression in each plate at the point of the weld.

In Fig. 3, one electrode R is provided with a depression T, with which the button or projection G on the other electrode S coöperates. The height of the projection or contact button G should be slightly greater, as shown in Fig. 3, than the depth of the depression T, so that intimate contact may be made between the metal of the plates D and the electrodes between the projection G and the depression T.

In Fig. 4 the projection U on electrode V is in the form of a circular ridge adapted to coöperate with the circular depression W in the electrode X, illustrating another form of the projection and depression in the electrodes.

In Fig. 5, each electrode a is provided with a circular ridge b, between which the plates D are placed. In Fig. 6 only one of the electrodes is provided with the circular ridge b, the other electrode c having a flat surface. In Figs. 4, 5 and 6 the form of the weld corresponds to the outline of the projecting portion on one electrode, that is, each weld is in the form of a ring. The outline of the projecting ridges may be varied as desired.

In Figs. 7 and 8, one electrode d is provided with ridges e, while the other electrode f is provided with depressions or recesses g which fall opposite the ridges e and the welds are formed along the line of the ridges.

In Figs. 9 and 10 each electrode d is provided with coöperating ridges e which fall opposite each other, along which the welds are formed.

In the form of apparatus shown in Fig. 11, the upper electrode h is provided with a movable central portion i adapted to project beyond the surface j of the electrode. The projecting contact portion i in this instance is shown spring-actuated, although any other suitable form of elastic means may be used. The coil spring k is arranged behind the portion i and normally tends to force said portion outwardly. Means are provided for varying the compression of the springs k, as by means of the plunger l having the plunger rod o, which extends through the upper portion of the electrode h, and is provided with adjusting nuts p. In this instance toggle acting means q are provided for forcing the electrodes together. When the toggle is broken the electrode h is moved away from the lower electrode B. When the toggle is forced outwardly to its fullest extent, the parts will take the position illustrated in Fig. 12. The apparatus shown in Figs. 11 and 12 may be operated in two ways. According to one way, the current is turned on and the contact portion i is first brought into contact with one of the plates D, then the toggle is forced down, finally bringing the surface $j$ of electrode $h$ into contact with the plate D. According to the other mode of operation the electrode $h$ is forced into intimate contact with the plate D, as in Fig. 12 and locked in this position. The current is then turned on and as the metal softens at the point of contact underneath the portion $i$, the pressure of the spring forces the contact portion $i$ outwardly, thereby forming a weld, and extra pressure upon the electrodes is not necessary. The weld is thus formed by continual pressure due to the spring $k$.

Obviously some features of this invention may be used without others and the invention may be embodied in widely varying forms, Therefore, without limiting the invention to the devices shown and described, and without enumerating equivalents, I claim and desire to obtain by Letters Patent the following:—

1. In a machine for welding sheet metals, a source of welding current, a spot-welding pole connected to said source of current and of cross-sectional area large enough to give it rigidity while permitting the development of a welding heat therein, a flat-faced surrounding body of metal, also connected to said source of current, and means for pressing said pole into a body of sheet metal a predetermined distance and bringing the flat face into contact with the sheet metal after said pole has penetrated the predetermined distance.

2. In a machine for welding sheet metals, a source of welding current, an electrode connected to said source and having a broad flat contact face provided with a welding protuberance rising from and surrounded by said flat face and having cross-sectional area large enough to give it rigidity while permitting the development of a welding heat, said flat face having sufficient superficial area surrounding said protuberance to confine the softened or fluid metal formed by it in welding, and means for pressing said protuberance into a body of sheet metal a predetermined distance and bringing the flat surrounding surface into contact with the sheet metal after the protuberance has penetrated the predetermined distance.

3. In a machine for welding sheet metals, a welding electrode having a broad flat contact face and provided with one or more relatively low isolated welding protuberances of relatively wide lateral extension, projecting from such flat contact face and spaced away from its margins to give a substantial surrounding area of such flat contact face.

4. A welding machine comprising a pair of opposing electrodes, one or both of said electrodes being provided with a substantially plane face having a low wide protuberance arising therefrom and centrally located thereon with a wide surrounding area of such plane face, and means for forcing said electrodes together.

5. A welding machine comprising a pair of combined welding electrodes and press dies, one or both of said electrodes being provided with a protuberance one lateral dimension of which is greater than its height, said protuberance rising from and surrounded by a plane surface on the end of said electrode, of greater area than the area of cross-section of said protuberance, such plane surface serving as a pressure and contact surface to press against and confine the metal surrounding the point of weld, and also serving to diffuse the current after the weld is complete, and means for forcing said electrodes together.

6. In a welding machine, an electrode having an initial contact portion of relatively small cross-sectional area and in proximity thereto a current-diffusing flat-surfaced contact portion of relatively larger area stepped back from the initial contact portion and surrounding the same constructed to make contact with the surfaces to be acted on after completion of the weld.

7. In an electric welding machine, the combination of two electrodes adapted to make contact with the material to be treated, at least one of said electrodes having a portion of its contacting face movable with regard to the residue of said face and means for exerting elastic pressure behind said portion.

8. In an electric welding machine, the combination of two electrodes adapted to make contact with the material to be treated, at least one of said electrodes having a portion of its contacting face movable with regard to the residue of said face, means for exerting elastic pressure behind said portion and means for forcing said electrodes together.

9. In an electric welding machine, the combination of two metallic electrodes having flat surfaces adapted to be pressed into contact with the material to be welded, at least one of said electrodes having a central spring pressed metal contact portion normally projecting beyond the face of the electrode, and adapted to make contact first over a relatively small area on the material to be welded.

10. In an electric welding machine, the combination of two metallic electrodes adapted to make contact with the material to be welded at the point of welding and having flat faces arranged opposite each other, one of said electrodes being provided with a portion projecting from its face and adapted to make contact with the material to be welded over a relatively small area, thereby producing a high resistance, said initial contact being adapted to be made before the flat face of the electrode comes into contact with the material, and means for forcing said electrodes together to cause the flat faces to come into contact with the material.

In testimony whereof I have signed this specification in the presence of two subscribing witnesses.

LAURENCE S. LACHMAN.

Witnesses:
E. VAN ZANDT,
A. L. O'BRIEN.